United States Patent Office 3,609,986
Patented Oct. 5, 1971

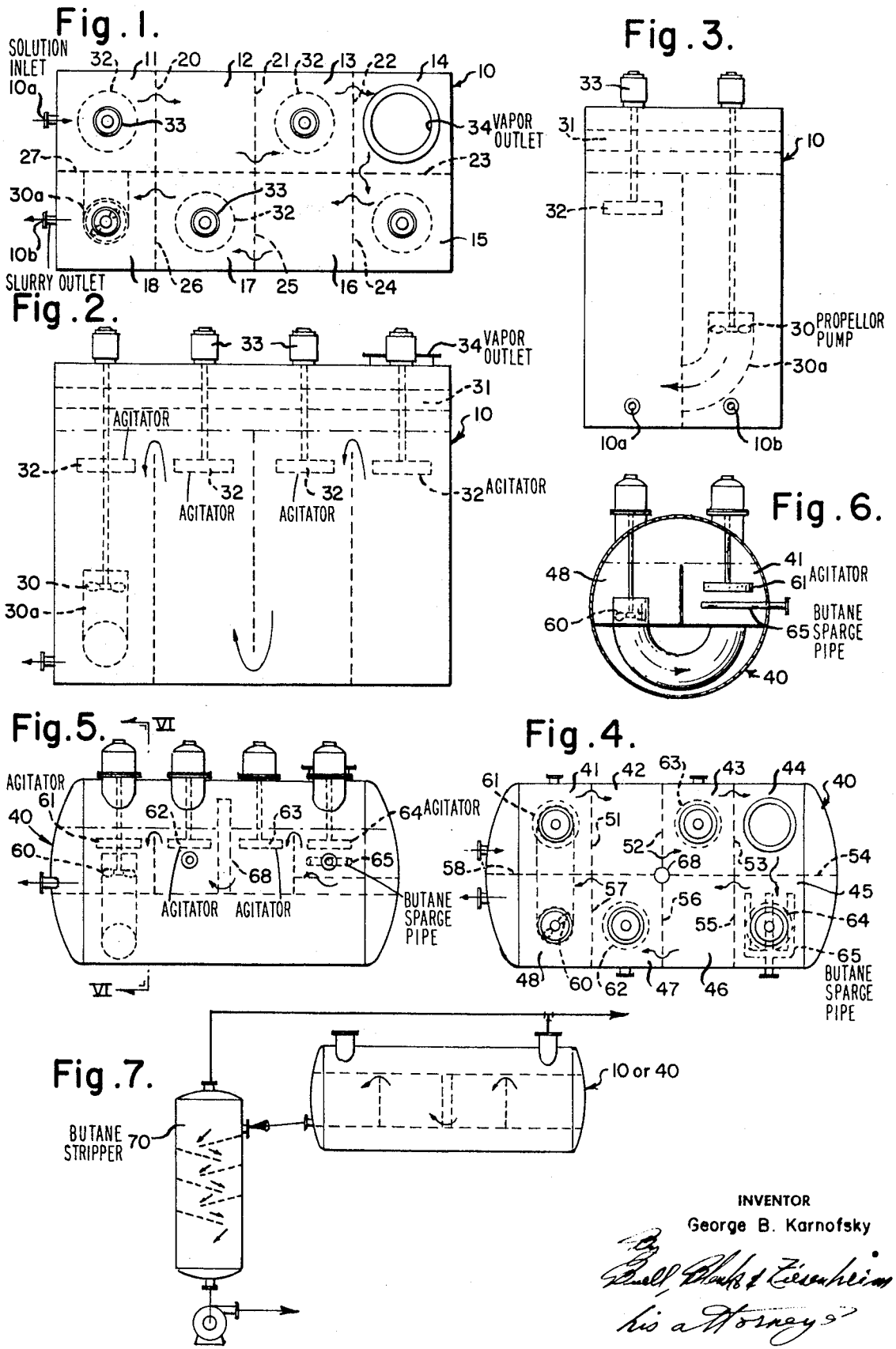

3,609,986
METHOD AND APPARATUS FOR FREEZING, UTILIZING A CONTINUOUS FLOW THROUGH MULTIPLE CHAMBERS
George B. Karnofsky, Mount Lebanon, Pa., assignor to Blaw-Knox Company, Pittsburgh, Pa.
Filed Jan. 17, 1968, Ser. No. 698,635
Int. Cl. B01d 9/04
U.S. Cl. 62—58         10 Claims

ABSTRACT OF THE DISCLOSURE

This specification discloses a system for partial freezing of solutions including improvements in freezing apparatus and method, to produce a solid crystallized product and a concentrated solution product, either or both of which may be the desired end product of the apparatus or the method. In particular, it relates to the technique of effecting partial freezing by the vaporization of liquid in, or mixed with, the solution being frozen, using a multi-compartmented freezing vessel in which the top of each compartment is open to a vapor space from which vaporized liquid is evacuated and the compartments are arranged in series to provide overflow of liquid from alternate compartments into the intervening compartments and underflow from the intervening compartments into the overflowing compartments. The method of partial freezing is to cause a recirculating flow of slurry of crystals and solution through an endless series of such alternate overflow, underflow compartments of substantial depth, vaporizing liquid at the surface of the slurry in the compartments to extract heat therefrom and undercool the solution in process, and retaining the undercooled solution in contact with the crystals in the lower parts of the compartments to effect crystallization and crystal growth therein.

---

This invention relates to methods and apparatus for freezing and particularly to methods and apparatus for freezing by direct vaporization of refrigerant in application to desalination of water.

This invention is an improvement over prior freezing techniques which take advantage of the phenomenon that, where heat is removed by vaporization of liquid from a freezing solution, the removal occurs at the vapor-liquid interface only, resulting in an abrupt temperature drop at the surface which supercools the liquid below its freezing temperature, producing a potential for crystal growth. Most of the actual freezing proceeds more slowly and occurs at lower levels where vaporization of the liquid does not occur. In the present invention, the liquid is conducted over and under vertical baffles, causing the solution supercooled at the liquid-vapor interface to descend to lower levels, crystallization occurring during such underflow.

Freezing by vaporization is not per se new. Pike Pat. 2,997,856 discloses undercooling of the liquid in an evaporation step effected in one vessel followed by crystallization in a specially designed tank providing a counterflow of ice crystals floating toward the top of this special tank through a downward flow of sub-cooled liquid. Svanoe 3,098,734 provides a horizontal labyrinth type crystallizer and Chirico 3,292,999 provides a process of cooling by evaporation to super-saturate a solution by introducing hot feed solution to a crystallizer near the bottom and inducing flow downwardly through a vertical draft tube. When the solution reaches the top of the vessel, it adiabatically cools and the cooled solution is drawn downwardly through draft tube to discharge at the bottom of the tube into the incoming stream.

Crystallization in a process for concentration of aqueous solutions by evaporation of a refrigerant in direct contact with slurry of crystals and solution, or more specifically crystallization in a freezer for saline water conversion, may best be accomplished by evaporation of refrigerant in small increments, each followed by a dwell time for crystal growth. This takes advantage of the principle that during refrigerant vaporization the primary effect is to sub-cool the solution, which subsequently comes to equilibrium with crystals in the slurry by deposition on additional crystalline solids, preferably by deposition on already existing nuclei. During this crystal growth period, the crystals must be kept in suspension. The present invention provides a method and apparatus which applies this principle in an economical and practical manner.

The foregoing principle is applicable whether the refrigerant is water from an aqueous solution or slurry, or a secondary refrigerant such as butane introduced into the slurry. The invention is herein exemplified in both of these forms.

In the case where water is the refrigerant, vaporization of water at about 3 mm. of mercury absolute can cause partial freezing of aqueous solutions. This is well known in the art. Vaporization takes place only from the surface of the solution because even very small hydrostatic heads prevent boiling at so low a pressure. In order to achieve practical vaporization rates, it has been found that the water must be violently agitated so as to form many droplets with enhanced surface for vaporization. The agitator must be entirely submerged for the reason that if vaporization occurs from the surface of the agitator, the crystals thus formed adhere to the agitator and eventually affect its performance.

In the case of secondary refrigerants, the same principles apply. In practice, such secondary refrigerant processes are carried out at pressures which are not far from atmospheric. Hydrostatic head is still of consequence in design of such systems; but boiling may occur at depths as much as three feet. Here, also, if an agitator is used, as to mix refrigerant with the slurry, it must be submerged below the calculated maximum depth at which vaporization can occur.

In a preferred embodiment and practice of my invention, I provide a closed vessel adapted to contain a solution to be treated, a plurality of compartments in said vessel, said compartments being connected successively by overflow and underflow connections, means in said vessel causing a circulation of slurry from compartment to compartment in succession, agitator means in a portion of said compartments adapted to create agitation in said compartments and means for creating an evaporation of liquid from said solution at said liquid-vapor interface. Preferably the agitator means are provided near the top of each compartment in which the slurry is rising.

In the foregoing general description, I have set out certain objects, purposes and advantages of my invention. Other objects, purposes and advantages of the invention will be apparent from a consideration of the following description and the accompanying drawings in which:

FIG. 1 is a top plan view of a preferred embodiment of freezer according to my invention for using water as a refrigerant;

FIG. 2 is a side elevation of the freezer of FIG. 1;

FIG. 3 is an end elevation of the embodiment of FIG. 1;

FIG. 4 is a top plan view of a second embodiment of freezer according to my invention particularly adapted to use of a secondary refrigerant;

FIG. 5 is a side elevation of the embodiment of FIG. 3;

FIG. 6 is a section on the line VI—VI of FIG. 5; and

FIG. 7 is a side elevation of a freezer according to my invention with an auxiliary cascade tower.

Referring to the drawings and particularly to FIGS. 1 and 2, I have illustrated a freezer according to my invention particularly applicable to vacuum freezing, in the form of a rectangular closed vessel 10 divided into eight compartments open to a common vapor space. Solution to be concentrated is fed through inlet 10a into compartment 11 and flows around a closed path from compartments 11 through 18 in succession. The baffles 20–27 between compartments are arranged to cause successive overflow and underflow. Thus slurry overflows baffle 20 from compartment 11 into compartment 12 and underflows baffle 21 from compartment 12 into compartment 13 and so forth until it reaches compartment 18. Between compartment 18 and compartment 11 there is a pump 30 by which a closed circulation of slurry is established. The pump 30 is illustrated as a propeller within a draft tube 30a, which is the preferred type of pump for the high flow, low head that is required in this particular application; however, other forms of pump may be used. This single pump is all that is required for slurry recirculation at a rate sufficiently high to keep the crystals in suspension. As the slurry reaches the top of its path in compartments 11, 13, 15, and 17, it is violently agitated by agitators 32 driven by motors 33 so that many droplets are formed in the vapor space above the compartment. The drops fall back into the moving slurry after a portion has vaporized from their surfaces. Compartments 12, 14, 16 and 18 provide the desired dwell time, as does much of the volume of compartments 11, 13, 15 and 17. Net production of slurry to match the rate of feed of solution is removed at the bottom of compartment 18 through outlet 10b. Water vapor may be removed at any convenient location from the top of the vessel. In FIGS. 1 and 2, the water vapor is removed through the nozzle 34 in the cover above compartment 14. A demister 31 is shown in FIGS. 2 and 3 blanketing the entire vapor space. This is, of course, an engineering option since the same effect may be accomplished by providing additional height in the vapor space.

In FIGS. 4 through 6, I have illustrated a second embodiment of my invention in which the same principles above described are applied to a system employing a secondary refrigerant such as butane. In these figures, I have shown a closed vessel in the form of a horizontal cylinder 40 divided into eight open-topped compartments 41–48 by vertical baffles 51–58. As previously described in connection with FIG. 1, there is provided a closed circulation of slurry maintained by a propeller pump 60, to overflow and underflow successive baffles 51–58. In the compartments 41, 43, 45 and 47, from which the recirculating slurry overflows, there are submerged agitators 61 through 64. Just below these agitators the secondary refrigerant is distributed in the solution through perforated pipes 65. Here the secondary refrigerant system differs from the vacuum system of FIG. 1 in that whereas the agitators in FIG. 1 were designed to throw solution into the vapor space as droplets, here they are designed to mix refrigerant and slurry well below the surface. The refrigerant sparge pipes 65 are shown to be streamlined in the direction of slurry flow past them in order to prevent crystals from hanging up on them.

The mechanical agitators 61 through 64 of FIGS. 3–5 are optional and other means of mixing or agitation may be employed. As is explained in my co-pending application Ser. No. 567,201, filed July 22, 1966, now U.S. Pat. No. 3,478,531, the agitation may be achieved by feeding to the refrigerant distribution pipes 65 a mixture of refrigerant and vapor at a pressure higher than that of the freezer. The mechanical energy imparted by the vapor sparge through the orifices of the distributor pipes 65 brings about the intimate mixing of refrigerant and slurry that is desired. Alternatively agitators may be used in conjunction with the feed of mixed vapor and liquid refrigerant.

In FIGS. 4–6, the floor of the compartments is shown above the bottom of the vessel. It is expected that in large scale commercial operation the tank diameter may be about 13 feet, and the desired total liquid depth not more than 6 feet. The unused space between the compartments' floor and the bottom of the vessel can be used to good advantage for the storage of refrigerant, as is explained in more detail in my co-pending application 567,201, now U.S. Pat. No. 3,478,531, and for this purpose I have shown in FIGS. 4 and 5 a vent pipe 68 at the center of the vessel which communicates between the refrigerant storage space at the bottom of the vessel and the vapor space at the top.

In the practice of freezing using a secondary refrigerant, it is desirable to maintain as high a concentration of refrigerant as possible within the crystallizer proper, since, in this way, the capacity for vaporization is maximized. However, it is necessary to remove most of the liquid refrigerant from the net slurry before the crystals are washed. In FIG. 7 I have shown the slurry flowing from the crystallizer vessel of FIGS. 4–6 into a vertical tower 70 designed to cause cascading of the slurry. This cascade tower is shown vented to the same refrigerant vapor removing means as is the crystallizing vessel, causing rapid vaporization of residual refrigerant. The cascade tower shown is one kind of apparatus that creates a large surface for vaporization. Other devices known to the art may be employed. If it is not desirable to elevate the crystallizing vessel, as shown in FIG. 7, then the slurry from the crystallizing vessel can be pumped to the cascade tower; or a horizontal vessel may be used for vaporization through which slurry may be pumped by the propeller pump of the crystallizing vessel.

The freezer shown in FIG. 7 may also be augmented by an auxiliary flash system (not shown) operating at a pressure lower than that employed in the crystallizing step, as is described in detail in my application Ser. No. 615,479 filed Feb. 13, 1967, now U.S. Pat. 3,528,256.

In the foregoing specification, I have illustrated and described certain preferred embodiments and practices of my invention. It will be understood, however, that this invention may be otherwise embodied within the scope of the following claims.

I claim:

1. A crystallizer comprising in combination a closed vessel, a plurality of side by side open top compartments within said vessel all open for intercommunicating flow of solution between compartments within said vessel and adapted to contain a solution to be partially crystallized by vaporization of liquid therefrom, a common vapor space within said vessel intercommunicating with the open top of each compartment, means for withdrawing vapor from said vapor space at a pressure producing evaporation of liquid at the surface of each compartment at a temperature effecting partial crystallization of said solution, the said intercommunicating flow of solution between the compartments comprised of overflow and underflow connections from compartment to compartment defining a closed path through the successive compartments for partially crystallized solution continuously alternately upwardly and downwardly in adjacent compartments, means for circulating the partially crystallized solution through said closed path, means for supplying fresh solution to said path and means for withdrawing partially crystallized solution from said path.

2. A crystallizer as in claim 1 further characterized by agitators below the level of the partially crystallized solution in at least one of the compartments wherein there is upward flow.

3. A crystallizer as in claim 2 in which said agitators are mechanical impellers.

4. A crystallizer as in claim 2 in which said agitators comprise sparge nozzles injecting an upward flow of a secondary refrigerant into said partially crystallized solution.

5. A crystallizer as in claim 3 in which said impellers are near the surface of the partially crystallized solution and adapted to fling droplets of said solution into said vapor space.

6. A crystallizer as in claim 5 in which said means for withdrawing vapors include vacuum generating means maintaining said vapor space at a sub-atmospheric pressure at which a solvent component of said solution is volatile.

7. A method of partial freezing of a solution by vaporization of a liquid therefrom to produce a slurry of crystals in concentrated solution, comprising the steps of introducing said solution into a recirculating stream comprised of said slurry of concentrated solution and crystals frozen therefrom, passing said stream continuously alternately upwardly and downwardly in a series of flow reversals as it recirculates through an endless path, forming a series of vapor-liquid interfaces at the high points of said recirculating stream where vaporization occurs as it flows alternately upwardly and downwardly by exposing said high points to a common vapor space, continuously withdrawing vapor from said common vapor space to effect vaporization of liquid in zones adjacent to said vapor-liquid interfaces, withdrawing as product a partially frozen solution-crystal slurry from said recirculating stream.

8. The method of claim 7 wherein the liquid is a solvent component of said solution.

9. The method of claim 7 characterized by introducing a vaporizable fluid immiscible with said solution at said zones adjacent said vapor-liquid interfaces.

10. The method of claim 7 characterized by agitating said recirculating streams in said zones.

References Cited

UNITED STATES PATENTS

| | | | |
|---|---|---|---|
| 2,190,280 | 2/1940 | Banigan et al. | 23—273 |
| 3,304,734 | 2/1967 | Dunn | 62—58 |
| 3,416,889 | 12/1968 | Caldwell | 23—273 |
| 3,424,221 | 1/1969 | Luce | 23—273 |
| 3,478,531 | 11/1969 | Karnofsky | 62—123 |

NORMAN YUDKOFF, Primary Examiner

R. T. FOSTER, Assistant Examiner

U.S. Cl. X.R.

62—123; 23—273 R